United States Patent
Yim (12)

(10) Patent No.: US 6,445,828 B1
(45) Date of Patent: Sep. 3, 2002

(54) TRANSFORM DOMAIN RESIZING OF AN IMAGE COMPRESSED WITH FIELD ENCODED BLOCKS

(75) Inventor: Changhoon Yim, Edison, NJ (US)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/162,377

(22) Filed: Sep. 28, 1998

(51) Int. Cl.[7] .................................................. G06K 9/36
(52) U.S. Cl. ..................... 382/250; 382/239; 375/240.2
(58) Field of Search ................................. 382/248, 236, 382/250, 251, 238; 348/412, 413, 414, 415, 416, 420, 699, 403.1, 407.1, 412.1, 413.1, 430.1, 431.1, 430; 375/340–240.22, 240.18, 240.2

(56) References Cited

U.S. PATENT DOCUMENTS

| | | | |
|---|---|---|---|
| 5,341,250 A | * 8/1994 | Uchida et al. | 358/335 |
| 5,351,086 A | * 9/1994 | Park | 348/402 |
| 5,453,788 A | * 9/1995 | Matsushima et al. | 382/246 |
| 5,475,432 A | * 12/1995 | Park | 348/409 |
| 5,708,732 A | * 1/1998 | Merhav et al. | 382/232 |
| 5,828,421 A | * 10/1998 | Bocye et al. | 348/565 |
| 5,832,120 A | * 11/1998 | Prabhakar et al. | 382/233 |
| 5,982,441 A | * 11/1999 | Hurd et al. | 375/240.22 |
| 5,990,976 A | * 11/1999 | Higashida | 348/588 |
| 6,057,884 A | * 5/2000 | Chen et al. | 348/416 |
| 6,108,448 A | * 8/2000 | Song et al. | 382/235 |

OTHER PUBLICATIONS

Chang et al. "Manipulation and Compositing of MC–DCT compressed Video" IEEE Journal on seleted areas in communications, vol. 13, No. 1, Jan. 1995.*

* cited by examiner

Primary Examiner—Amelia M. Au
Assistant Examiner—Jingge Wu
(74) Attorney, Agent, or Firm—J. S. Tripoli; E. P. Herrmann

(57) ABSTRACT

A video editing system which resizes a video stream in a transform domain is disclosed. The video editing system partial decodes a compressed video stream in order to obtain a transform domain representation of the video stream. The transform domain representation of the video stream includes both frame encoded blocks and field encoded blocks. The field encoded blocks result from reordering of pels prior to transform domain encoding the pels. The frame encoded blocks, however, result from transform domain encoding pels without reordering pels. Accordingly, the video editing system of the present invention accounts for the encoding differences between the field encoded blocks and the frame encoded blocks when resizing the video stream in the transform domain. To this end, the video editing system includes field resizing matrices for resizing the field encoded blocks and frame resizing matrices for resizing the frame encoded blocks. The video editing system selects and applies appropriate matrices to the encoded blocks the video stream in order to resize the video stream in the transform domain.

8 Claims, 8 Drawing Sheets

TRANSFORM DOMAIN RESIZING OF AN IMAGE COMPRESSED WITH FIELD ENCODED BLOCKS

GOVERNMENT LICENSE

This invention was made with Government support under Contract No. 70NANB5H1174 awarded by the National Institute of Standards and Technology. The Government has certain rights in this invention.

FIELD OF THE INVENTION

The present invention relates generally to video data processing, and more particularly, to transform domain resizing of an image represented in a transform domain with transform domain blocks representing reordered pels.

BACKGROUND OF THE INVENTION

Video data is commonly compressed utilizing a compression standard such as MPEG-1, MPEG-2, and H.261. In order to obtain a compressed representation of the video data, these compression standards utilize intraframe and interframe coding techniques in order to exploit spatial and temporal redundancies often found within video data.

Intraframe coding techniques exploit redundancies within a single frame of video data. A common intraframe coding technique employs a block-based two-dimensional transform that transforms each frame of video data from a spatial domain to a transform domain. One common intraframe coding technique first divides a video frame into 8×8 blocks of pels, and independently applies a two-dimensional discrete cosine transform (DCT) to each pel block. This operation results in an 8×8 block of DCT coefficients in which most of the energy in the original pel block is typically concentrated in a few low-frequency coefficients. The 8×8 block of DCT coefficients is then quantized and variable length encoded in order to reduce the number of bits necessary to represent the original 8×8 pel block.

In contrast to intraframe coding techniques, interframe coding techniques exploit temporal redundancies often found between temporally adjacent video frames. These compression standards exploit temporal redundancy by computing an interframe difference signal called "prediction error." In computing the prediction error, the technique of motion compensation is employed to correct the prediction for motion. One type of unidirectional motion estimation utilized by the MPEG-2 standard is known as "forward prediction." In forward prediction, a target macroblock of a video frame to be encoded is matched with pel blocks of the same size in a past video frame called the "reference video frame." The pel block in the reference video frame that best matches the target macroblock is used as a prediction macroblock. A prediction error macroblock is then computed as the difference between the target macroblock and the prediction macroblock. The prediction error macroblock is then encoded utilizing the two-dimensional DCT encoding technique described above. Moreover, the position of the prediction macroblock within the reference frame is indicated by a motion vector that indicates a horizontal and vertical pel displacement between the target macroblock and the prediction macroblock. The motion vector is then encoded for transmission along with the encoded prediction error macroblock.

Some video compression standards, such as the MPEG-2 standard, also provide specialized encoding schemes that more efficiently compress video streams containing interlaced video frames. For example, the MPEG-2 standard provides for field DCT encoding and frame DCT encoding of interleaved macroblocks. The difference between field DCT encoding and frame DCT encoding, is that field DCT encoding reorders pels of the macroblock prior to DCT encoding. The pels are reordered in an attempt to increase vertical correlation within the macroblock and thus increase the energy compaction of DCT encoding video streams.

One feature of compressed video is that the image resolution may be changed to accommodate available bandwidth. For example, in order to lower the bandwidth required to transmit a video stream, the resolution of the video stream may be reduced. The method by which resolution may be reduced is through image or video frame resizing. Frames of a video stream may be resized in order to achieve a second representation of the video stream having a desired resolution.

Essentially, resizing of a video stream involves resizing each video frame of the video stream. For example, an MPEG-2 video stream may include frames having a resolution of 720×480 pels. Each frame of the MPEG-2 video stream may be downsized by a factor of two in order to obtain a second representation of the first video stream that includes frames of 360×240 resolution. Similarly, an MPEG-2 video stream may include frames having a resolution of 360×240. Each frame of the an MPEG-2 video stream may be upsized by factor of two in order to obtain a second representation of the an MPEG-2 video stream that includes frames of 720×480 resolution.

Changing the resolution of an image has practical uses in many environments. For example, image resolution may be altered in order to (i) convert from one video format to another, (ii) alter the displayed size of the image on a computer display, and (iii) display a smaller representation of the image on a television screen to obtain a picture-in-picture effect.

FIG. 1 depicts a block diagram of a prior art video editing system 100 that utilizes a traditional approach for resizing video compressed in accordance with the MPEG-2 standard. The video editing system 100 essentially decompresses the video stream to obtain the video stream in the spatial domain, upsamples or downsamples the decompressed video stream in the spatial domain in order to obtain an edited video stream with the desired frame resolution, and compresses the edited video stream in order to place the edited video stream back into the compressed domain.

While the video editing system 100 is a relatively intuitive implementation of a compressed video editing system, the video editing system 100 is also computationally intensive due to (1) the high computational complexity of the decompression and compression tasks, and (2) the large volume of spatial domain data that must be manipulated. Due to the computational complexity of the video editing system 100, the hardware required to implement the video editing system 100 may be costly.

For this reason there has been a great effort in recent years to develop fast algorithms that perform these tasks directly in the compressed domain and thereby avoid the need to completely decompress the video stream. One such example is U.S. Pat. No. 5,708,732 to Merhav et al., entitled Fast DCT Domain Downsampling and Inverse Motion Compensation, the disclosure of which is hereby incorporated by reference. The Merhav patent discloses a method of altering the spatial resolution of a compressed video stream in the DCT domain. In particular, the Merhav patent discloses downsizing a DCT domain representation of a video image by factors of 2, 3 and 4.

However, one drawback of the method described in the Merhav patent arises from the method being limited to frame DCT encoded macroblocks. In other words, the method described in the Merhav patent does not address resizing video frames which include field DCT encoded blocks. Many compressed video streams currently include both field and frame DCT encoded blocks. Since the method disclosed in the Merhav patent does not account for pel reordering inherent to field DCT encoding, the method of the Merhav patent cannot be used to resize video streams that include field DCT encoded blocks. If the method of the Merhav patent were applied to an MPEG-2 video stream that includes field DCT encoded blocks, then the method would produce a resized video stream having visibly garbled areas due to its failure to account for pel reordering inherent to field DCT encoding. As should be appreciated, a video stream having garbled areas would be completely unacceptable to viewers of resized video streams.

Accordingly, there is still a need for method and apparatus that perform transform domain resizing of transform domain blocks representing spatially reordered pels of an image or video frame.

SUMMARY OF THE INVENTION

The present invention fulfills the above need, as well as others, by providing a resizing unit that resizes in the DCT domain video frames represented by field DCT encoded blocks as well as frame DCT encoded blocks. In general, the resizing unit resizes video frames which are represented in the DCT domain with both frame DCT encoded blocks and field DCT encoded blocks. To this end, the resizing unit selects appropriate precalculated resizing matrices to apply to the encoded blocks of the video frame. In particular, the resizing unit selects and applies field resizing matrices and frame resizing matrices to the encoded blocks of the video frame in order to resize the video frame. The field resizing matrices account for pel reordering resulting from field DCT encoding pel blocks of the video frame. The frame resizing matrices do not account for luminance pel reordering since frame DCT encoding does not reorder luminance pels before DCT encoding. By utilizing different resizing matrices for the field encoded blocks and the frame encoded blocks, the resizing unit of the present invention resizes video streams in the DCT domain without introducing undesirable artifacts that would otherwise arise if only a single type of resizing matrices were utilized for both field DCT encoded blocks and frame DCT encoded blocks.

An exemplary method according to the present invention is a method of resizing a spatial domain image represented in a transform domain by transform domain blocks. One step of the method includes obtaining a first transform domain block from the transform domain blocks. Another step of the method includes determining whether the first transform domain block represents in the transform domain (i) spatially reordered pels of the spatial domain image, or (ii) spatially intact pels of the spatial domain image. The method also includes the step of performing in the transform domain, field block resizing operations upon the first transform domain block if the determining step determines that the first transform domain block represents spatially reordered pels of the spatial domain image. The method also includes the step of performing in the transform domain, frame block resizing operations upon the first transform domain block if the determining step determines that the first transform domain block represents spatially intact pels of the spatial domain image.

The present invention further includes various apparatus for carrying out the above method. For example, one apparatus according to the present invention includes a buffer, a matrix store, and a processor coupled to the buffer and the matrix store. The buffer is operable to store transform domain blocks that represent a spatial domain image in a transform domain. The matrix store is operable to store resizing matrices. The processor is operable to obtain from the buffer a first transform domain block that represents in the transform domain spatially reordered pels of the spatial domain image. The processor is also operable to apply a first field resizing matrix of the resizing matrices to the first transform domain block in order obtain a resized transform domain block that has a different resolution than the first transform domain block.

The above features and advantages, as well as others, will become more readily apparent to those of ordinary skill in the art by reference to the following detailed description and accompanying drawings.

DETAILED DESCRIPTION

Figure 1:
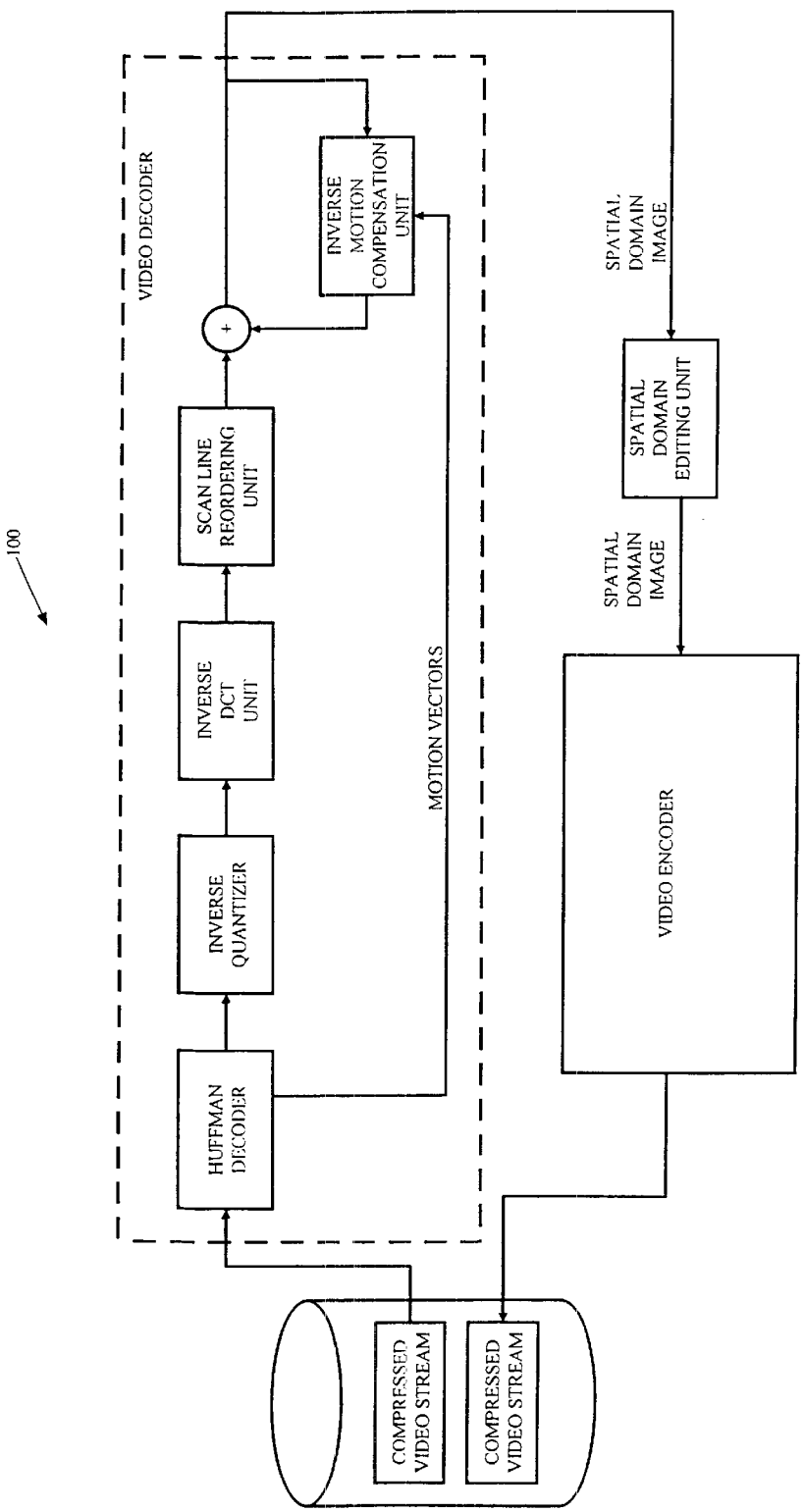
FIG. 1 shows a block diagram of a prior art video editing system which resizes a compressed video stream in the spatial domain.
Figure 2:
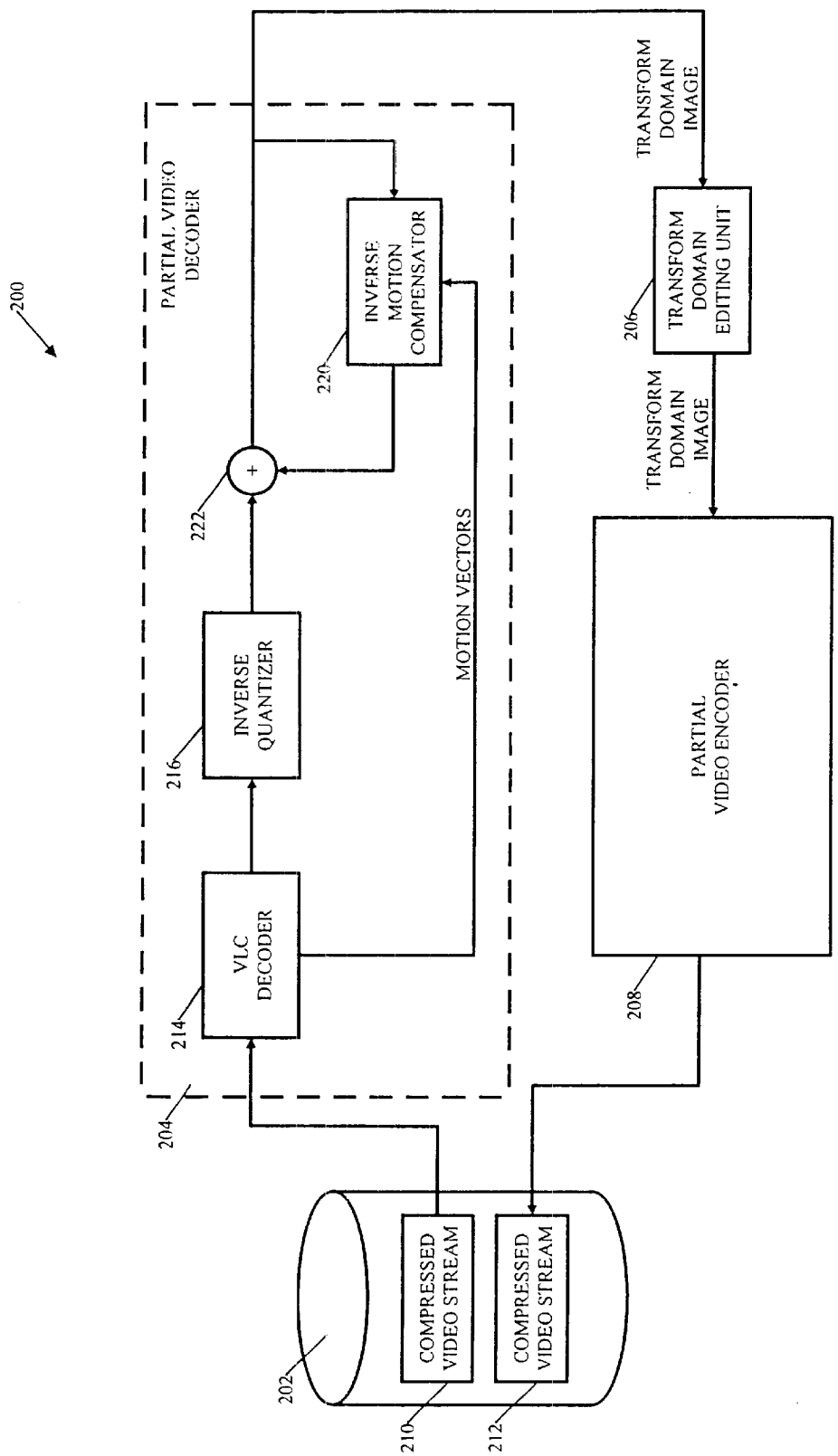
FIG. 2 shows a block diagram of a video editing system which resizes a compressed video stream by performing image manipulation operations directly upon a transform domain representation of a video stream in accordance with the present invention.

FIG. 2 shows a video editing system 200 that incorporates the principles of the present invention. In particular, the video editing system 200, shown in FIG. 2, essentially performs video editing directly in the DCT domain, thus eliminating computations associated with converting blocks between the spatial domain and the DCT domain. As depicted, the video editing system 200 includes a mass storage device 202, a partial video decoder 204, a transform domain editing unit 206, and a partial video encoder 208.

The mass storage device 202 of the video editing system 200 is operable to store digital information such as compressed video streams 210 and 212. Moreover, the mass storage device 202 may be implemented with various known storage devices such as hard drives, tape drives, CD-ROM drives, DVD drives, and RAID (redundant array of independent disks) devices. In order to simplify the following description of the video editing system 200, the video streams 210 and 212 stored on the mass storage device 202 are assumed to be video streams compressed in accordance with the MPEG-2 standard. It will be noted that in other implementations the mass storage device 202 may be replaced with another source of compressed video data.

Figure 3:
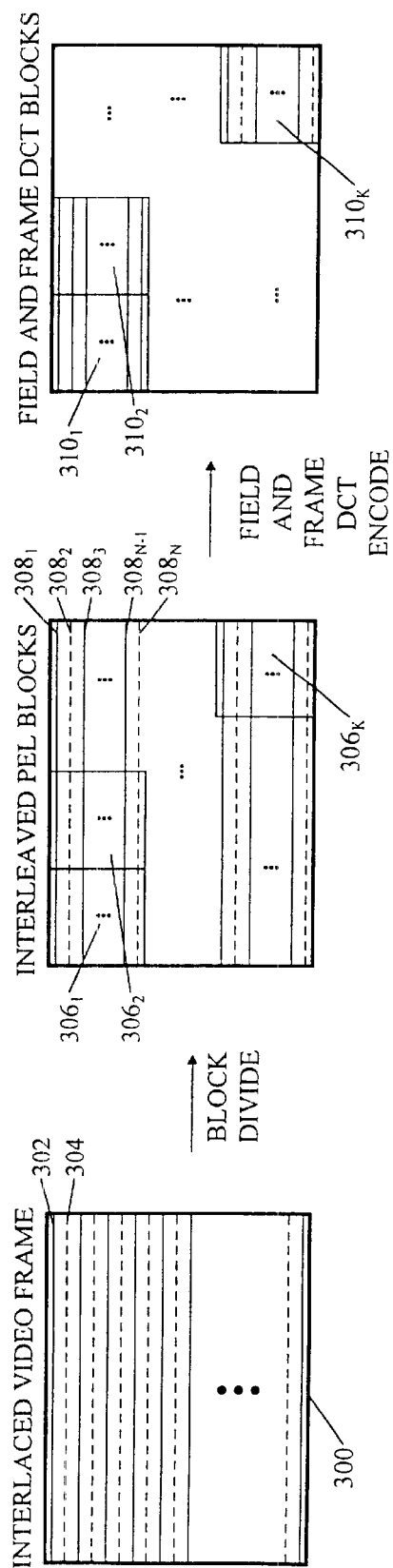
FIG. 3 illustrates frame picture encoding used by the MPEG-2 standard to encode interlaced video frames.

In any event, the mass storage device 202 stores compressed video streams that include frame picture encoded video with both field DCT encoded macroblocks and frame DCT encoded macroblocks. More specifically, a frame-picture encoding is an MPEG-2 standardized scheme for encoding interlaced video frames. Frame-picture encoding of an interlaced video frame 300 is depicted in FIG. 3. As depicted, the interlaced video frame 300 includes a top field 302 of pel lines and a bottom field 304 of pel lines which are interleaved together to form the interlaced video frame 300. Frame-picture encoding essentially encodes the top field 302 and the bottom field 304 of a interlaced video frame 300 together. To this end, frame-picture encoding divides the interlaced video frame 300 into interleaved macroblocks $306_1$, $306_2$, ... $306_K$ of top field scan lines $308_1$, $308_3$, ... $308_{N-1}$ and bottom field scan lines $308_2$, $308_4$, ... $308_N$. Frame-picture encoding then DCT encodes each of the interleaved macroblocks $306_1$, $306_2$, ... $306_K$ in order to obtain DCT encoded macroblocks $310_1$, $310_2$, ... $310_K$ which represent the interlaced video frame 300 in the DCT domain.

To this end, frame-picture encoding performs an 8×8 block based DCT upon each 8×8 block of pels of the interleaved macroblocks $306_1$, $306_2$, ... $306_K$. In particular, the 8×8 block based DCT converts a pel block $\{x(n, m)\}$ in the spatial domain into a corresponding 8×8 matrix of frequency components $\{X(k, l)\}$ according to the following equation:

$$X(k, l) = \frac{c(k)}{2}\frac{c(l)}{2}\left[\sum_{n=0}^{N-1}\sum_{m=0}^{N-1} x(n, m)\cos\left(\frac{(2n+1)}{2N}k\pi\right)\cos\left(\frac{(2m+1)}{2N}l\pi\right)\right] \quad (1)$$

where N=8 for the 8×8 block based DCT, $c(0)=1/\sqrt{2}$, $c(k)=1$ for k>0, and $c(l)=1$ for l>0.

Equation (1) may also be represented in a matrix form as follows:

$$X = C_N x\, C_N^t \quad (2)$$

where $x=\{x(n, m)\}$, $X=\{X(k, l)\}$, $C_N^t$ is the transposition of matrix $C_N$, and $C_N=\{z(k, n)\}$, where:

$$z(k, n) = \frac{c(k)}{2}\cos\left(\frac{(2n+1)}{2N}k\pi\right) \quad (3)$$

The above transformation of an 8×8 pel block results in an 8×8 block of DCT coefficients in which most of the energy in the original pel block is typically concentrated in a few low-frequency coefficients.

Frame picture encoded video data typically includes both field DCT encoded and frame DCT encoded blocks. Frame DCT encoded blocks are encoded directly from the interleaved pel blocks. Field DCT encoded blocks, however, are encoded with at least some of the pel data reordered such that it is de-interleaved.

Figure 4:
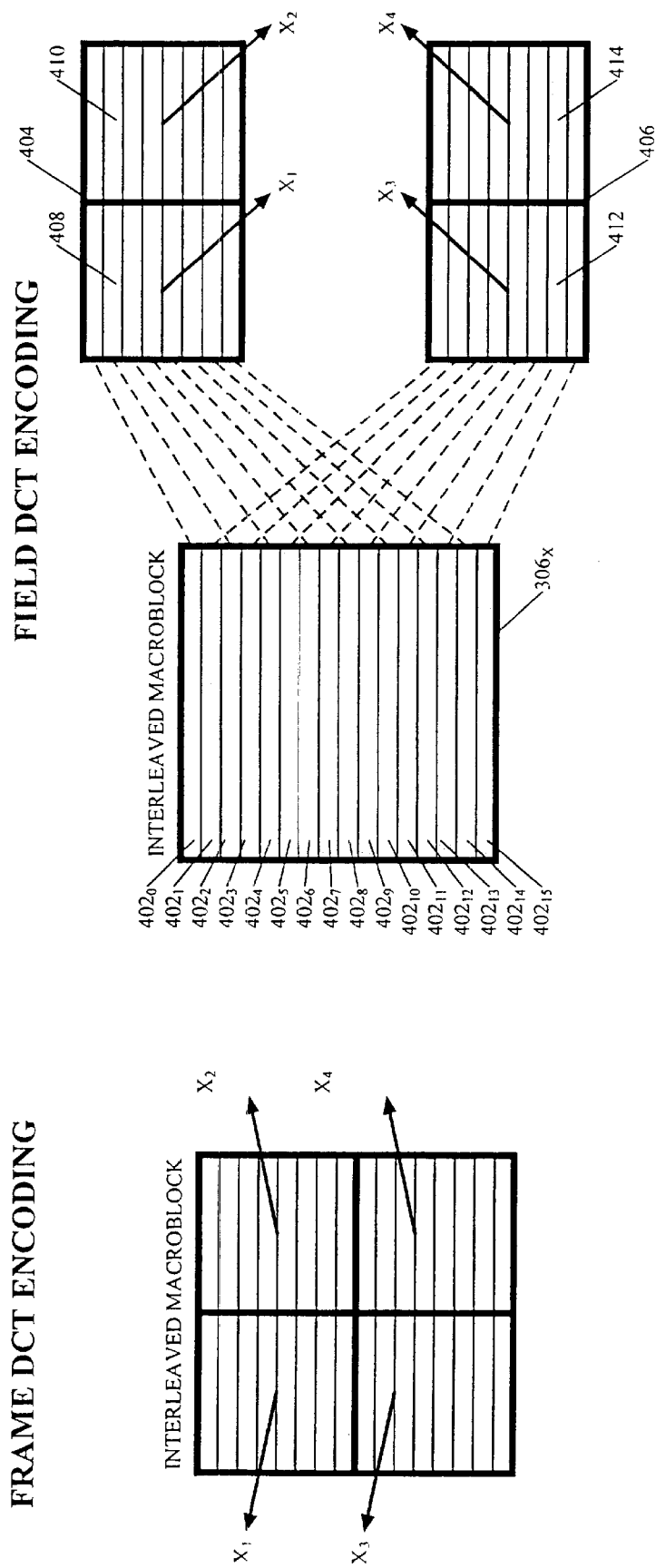
FIG. 4 illustrates frame DCT encoding and field DCT encoding used in MPEG-2 frame picture encoding.

In particular, in frame-picture encoding, because alternate scan lines come from different fields, motion in the scene causes a reduction of correlation between vertically adjacent pels. Field DCT encoding, by reordering pels, increases the compression resulting from frame-picture encoding. Field DCT encoding is illustrated in FIG. 4. Field DCT encoding essentially spatially reorders luminance (Y) pels of an interleaved macroblock $306_X$ before DCT encoding. In particular, in accordance with the MPEG-2 Main Profile, the interleaved macroblock $306_X$ includes sixteen luminance (Y) lines $402_0$, $402_1$, ... $402_{15}$ each having sixteen luminance pels. Field DCT encoding groups the eight top field luminance lines $402_0$, $402_2$, ... $402_{14}$ together to form an upper 8×16 block 404 of luminance pels, and groups the eight bottom field luminance lines $402_1$, $402_3$, ... $402_{15}$ together to form a lower 8×16 block 406. After reordering the sixteen luminance lines of an interleaved macroblock $306_X$, field DCT encoding converts the two 8×8 pel blocks 408, 410 comprising the upper 8×16 block 404 of luminance pels to two 8×8 DCT blocks $X_1$ and $X_2$ in accordance with the above described 8×8 DCT transform.

Similarly, field DCT encoding converts the two 8×8 pel blocks 412, 414 comprising the lower 8×16 block 406 of luminance pels to two 8×8 DCT blocks $X_3$ and $X_4$. The effect of reordering the luminance lines is to increase the vertical correlation within the interleaved macroblock $306_X$ and thus increase the energy compaction obtained by transforming the interleaved macroblock $306_X$ to the DCT domain.

It should be noted, however, that each interleaved macroblock $306_X$ also includes one 8×8 block of first chrominance (Cb) pels, and one 8×8 block of second chrominance (Cr) pels which are not reordered in MPEG-2 Main Profile before field DCT encoding the interleaved macroblock $306_X$.

Referring back to the video editing system 200 of FIG. 2, the partial video decoder 204 of the video editing system 200 is operable to receive the MPEG-2 frame picture encoded video stream 210 from the mass storage device 202, and output a DCT domain representation of the frame picture encoded video stream 210. Accordingly, for intraframe encoded blocks, the partial video decoder 204 is operable to extract from the MPEG-2 video stream 210, blocks of DCT coefficients that represent intraframe encoded pel blocks in the DCT domain. Moreover, for interframe encoded blocks, the partial video decoder 204 is operable to construct blocks of DCT coefficients that represent interframe encoded pel blocks in the DCT domain.

To this end, the partial video decoder 204 includes a variable length decoder 214, such as a Huffman decoder, that is operable to variable length decode the MPEG-2 video stream 210 in order to obtain quantized DCT blocks from the compressed video stream 210. Moreover, the partial video decoder 204 includes an inverse quantizer 216 that is operable to receive and dequantize the quantized DCT blocks in order to obtain from the video stream 210 DCT blocks that represent intraframe encoded pel blocks.

Similarly, for interframe encoded blocks, the partial video decoder 204 is operable to construct a DCT block that represents a reconstructed pel target block in the DCT domain. To this end, the variable length decoder 214 of the partial video decoder 204 is further operable to variable length decode the compressed video stream 210 in order to obtain motion vectors and quantized DCT prediction error blocks. Moreover, the inverse quantizer 216 of the partial video decoder 204 is further operable to receive and dequantize the quantized DCT prediction error blocks in order to obtain DCT prediction error blocks from the MPEG-2 video stream 210.

The partial video decoder 204 also includes an inverse motion compensation unit 220 and adder 222 in order to reconstruct interframe encoded DCT blocks. The inverse motion compensation unit 220 is operable to construct a DCT prediction block P in the DCT domain based upon a DCT reference frame and a motion vector that indicates horizontal and vertical displacements between a pel prediction block p and a pel target block x.

For intraframe encoded blocks, the adder 222 is operable to receive DCT encoded blocks of pels from the dequantizer 216, and pass the received DCT blocks through to the transform domain editing unit 206. For interframe encoded blocks, however, the adder 222 is operable to construct DCT target blocks X based upon DCT prediction blocks P and DCT prediction error blocks E. To this end, the adder 222 is operable to receive DCT prediction blocks P from inverse motion compensation unit 220, receive DCT prediction error blocks E from the dequantizer 216, and add the received DCT prediction blocks P to their corresponding prediction error block E in order to obtain DCT target blocks X. This reconstruction of interframe encoded blocks is represented by the following Equation:

$$X = P + E \tag{4}$$

where X is an 8×8 block of DCT coefficients that represent the reconstructed 8×8 pel target block x in the DCT domain, P is an 8×8 block of DCT coefficients that represent the 8×8 pel prediction block p in the DCT domain, and E is an 8×8 block of DCT coefficients that represent the 8×8 pel prediction error block e in the DCT domain. The operation of the partial video decoder 204 is disclosed in further detail in applicant's copending application, Transform Domain Inverse Motion Compensation With Fractional Pel Accuracy, the disclosure of which is hereby incorporated by reference.

The transform domain editing unit 206 is operable to receive the 8×8 DCT blocks of the partially decoded MPEG-2 video stream, which includes both field DCT encoded blocks and frame DCT encoded blocks, from the partial video decoder 204. The transform domain editing unit 206 is further operable to edit the partially decoded MPEG-2 video stream by performing image manipulation operations directly upon the field and frame DCT encoded blocks. For example, the transform domain editing unit 206 may perform various transcoding, image resizing, and compositing operations directly upon the field and frame DCT encoded blocks. In particular, the transform domain editing unit 206 of the present invention is operable to directly resize, in the DCT domain, interlaced frame pictures that include both field DCT encoded macroblocks and frame DCT encoded macroblocks. Such operations of the transform domain editing unit 206 are discussed further below in connection with FIG. 5.

Referring again to FIG. 2, the partial video encoder 208 of the video editing system 200 is operable to receive the DCT blocks of the edited MPEG-2 video stream, quantize the received DCT blocks, and variable length encode the quantized DCT blocks in order to obtain an edited MPEG-2 video stream 212. Moreover, the mass storage device 202 is operable to receive and store the edited compressed video stream 212. It should be appreciated that the partial video encoder 208 may further include a interframe encoding unit that is operable to interframe encode DCT frames in order to further compress the edited MPEG-2 video stream 212.

Figure 5:
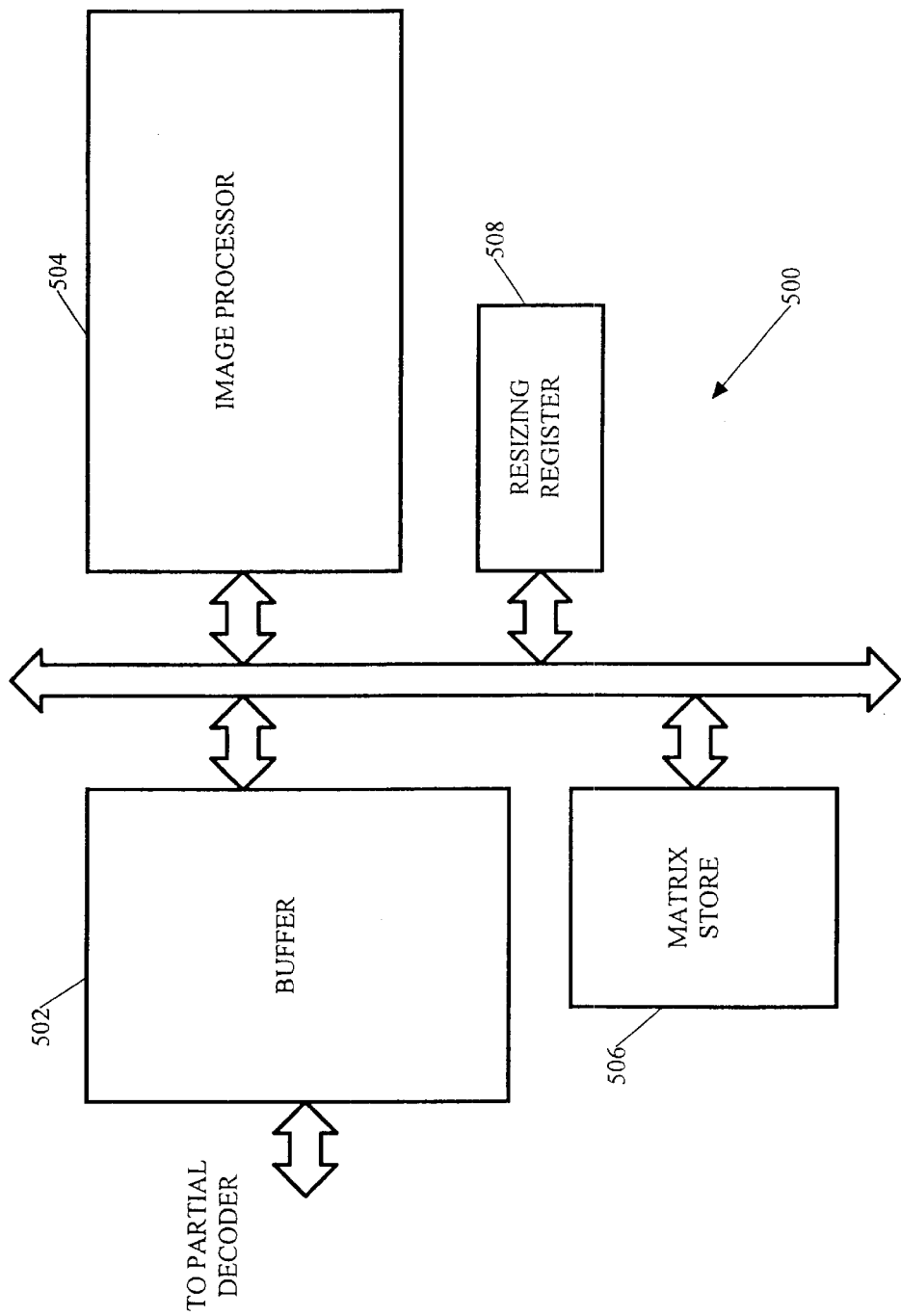
FIG. 5 illustrates a block diagram of the resizing unit used by the video system shown in FIG. 2.

FIG. 5 illustrates a resizing unit 500 of the transform domain editing unit 206. The resizing unit 500 is operable to resize video streams by manipulating DCT blocks of the video stream. The resizing unit 500 of the transform domain editing unit 206 includes a buffer 502. The buffer 502 is operable to receive the DCT blocks from the partial video decoder 204, and store the received DCT blocks until the resizing unit 500 resizes the received DCT blocks.

The resizing unit 500 also includes an image processor 504, a matrix store 506, and a resizing register 508. The image processor 504 is operable to resize the DCT blocks stored in the buffer 502 by factors stored in the resizing register 508. In particular, the image processor 504 is operable to select appropriate resizing matrices from the matrix store 506, and apply the selected matrices to the DCT blocks of the video frame in order to resize the video frame.

Specifically, the image processor 504 is operable to resize each frame DCT encoded block of the video stream in accordance with the following equation:

$$Y_F = T_F^v X_F T_F^h \tag{5}$$

where $X_F$ represents frame DCT encoded block(s), $T_F^v$ represents a DCT vertical resizing matrix for resizing frame DCT encoded block(s) $X_F$ in the vertical direction, $T_F^h$ represents a DCT horizontal resizing matrix for resizing frame DCT encoded block(s) $X_F$ in the horizontal direction, and $Y_F$ represents the frame DCT block(s) $X_F$ resized by the DCT resizing matrices $T_F^v$ and $T_F^h$.

Moreover, the image processor 504 is operable to resize each field DCT encoded block of the video stream in accordance with the following equation:

$$Y_f = T_f^v X_f T_f^h \tag{6}$$

where $X_f$ represents field DCT encoded block(s), $T_f^v$ represents a DCT vertical resizing matrix for resizing field DCT encoded block(s) $X_f$ in the vertical direction, $T_f^h$ represents a DCT horizontal resizing matrix for resizing field DCT encoded block(s) $X_f$ in the horizontal direction, and $Y_F$ represents the field DCT block(s) $X_f$ resized by the DCT resizing matrices $T_f^v$ and $T_f^h$.

Downsizing by a Factor of Two

Figure 6:
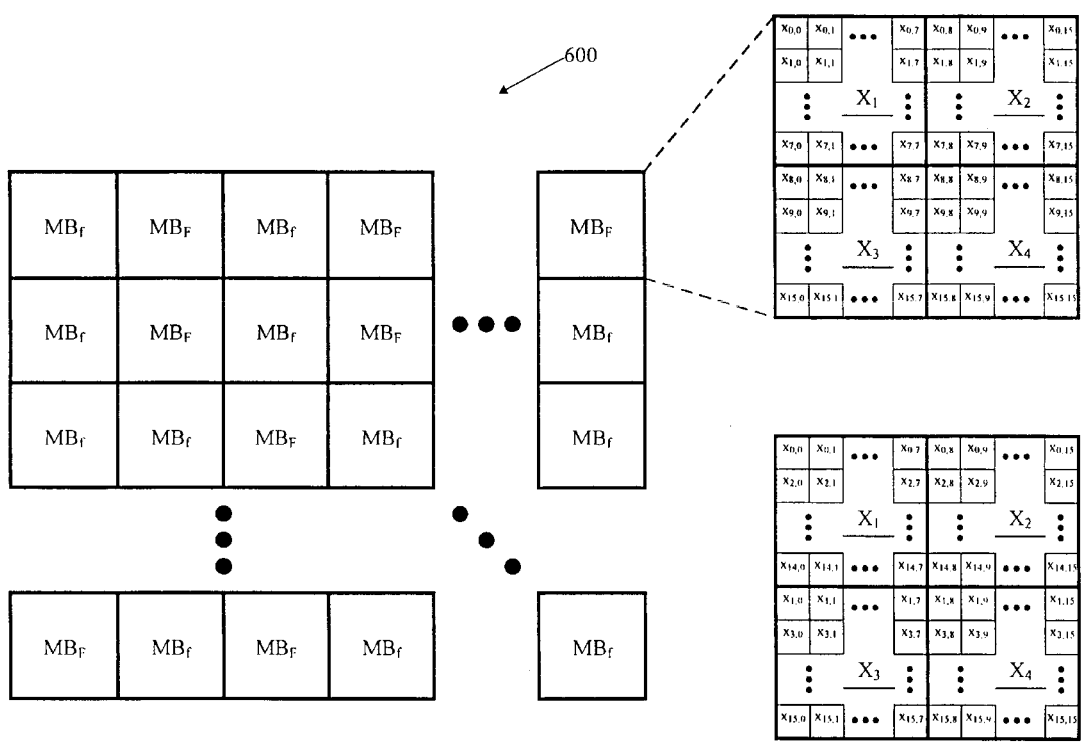
FIG. 6 shows a video frame and the spatial orientation of luminance pel represented by frame DCT encoded macroblocks and field DCT encoded macroblocks.

In order to explain the operation of the resizing unit 500, downsizing a video frame by a factor of two in both the vertical and horizontal directions will be discussed in detail. A video frame 600 is shown in FIG. 6. As depicted, the video frame 600 includes both frame DCT encoded macroblocks $MB_F$ and field DCT encoded macroblocks $MB_f$. In accordance with the Main Profile MPEG-2 standard, each frame DCT encoded macroblock $MB_F$ includes four 8×8 frame DCT encoded blocks $X_1$, $X_2$, $X_3$, and $X_4$ that respectively represent four 8×8 luminance pel blocks $x_1$, $x_2$, $x_3$, and $x_4$ in the DCT domain. The four 8×8 luminance pel blocks $x_1$, $x_2$, $x_3$, and $x_4$ together form a single 16×16 luminance frame block $x_F$ which may be represented as follows:

$$x_F = \begin{bmatrix} x_{0,0} & x_{0,1} & \cdots & x_{0,15} \\ x_{1,0} & x_{1,1} & \cdots & x_{1,15} \\ \vdots & \vdots & \ddots & \vdots \\ x_{15,0} & x_{15,1} & \cdots & x_{15,15} \end{bmatrix} \tag{7}$$

where $x_{k,l}$ represents the intensity level of a single luminance pel. The luminance frame block $x_F$ may then be represented in the DCT domain by a DCT frame block $X_F$ which comprises the four frame DCT encoded blocks $X_1$, $X_2$, $X_3$, and $X_4$.

Similarly, each field DCT encoded macroblock $MB_f$ includes four 8×8 field DCT encoded blocks $X_1$, $X_2$, $X_3$, and $X_4$. Since the luminance lines of the upper field and the lower field are separated during field DCT encoding, the field DCT blocks $X_1$, $X_2$, $X_3$, and $X_4$ represent reordered versions of the four 8×8 luminance pel blocks $x_1$, $x_2$, $x_3$, and $x_4$. Together, the field DCT blocks $X_1$, $X_2$, $X_3$, and $X_4$ represent a single 16×16 field block $x_f$ of reorder luminance pels. The field block $x_f$ may be represented in intensity levels $x_{k,l}$ of the frame block $x_F$ as follows:

$$x_f = \begin{bmatrix} x_{0,0} & x_{0,1} & \cdots & x_{0,15} \\ x_{2,0} & x_{2,1} & \cdots & x_{2,15} \\ \vdots & \vdots & \ddots & \vdots \\ x_{14,0} & x_{14,1} & \cdots & x_{14,15} \\ x_{1,0} & x_{1,1} & \cdots & x_{1,15} \\ x_{3,0} & x_{3,1} & \cdots & x_{3,15} \\ \vdots & \vdots & \ddots & \vdots \\ x_{15,0} & x_{15,1} & \cdots & x_{15,15} \end{bmatrix} \quad (8)$$

Similar to the frame pel block $x_F$, the field pel block $x_f$ may then be represented in the DCT domain by a field DCT block $X_f$ which comprises the four field DCT encoded blocks $X_1$, $X_2$, $X_3$, and $X_4$.

As stated previously, the chrominance pels of MPEG-2 video frames are not field DCT encoded in the Main Profile of the MPEG-2 standard. Accordingly, only resizing of luminance DCT blocks is described in detail since the frame DCT resizing techniques described below are also applicable to resizing the chrominance DCT blocks.

A relatively simple and effective method of downsizing the video frame 600 by a factor of two is to downsample intensity values of the video frame 600 by a factor of two. Downsampling by a factor of two may be accomplished by averaging the intensity values is of two spatially adjacent pels to obtain a single pel having an intensity value equal to the obtained average. Vertical sampling of the pel frame block $x_F$ may be written in equation form as:

$$x_F^v = S_F x_F \quad (9)$$

where $S_F$ represents a frame sampling matrix, and $x_F^v$ represents a vertically resized pel block due to sampling the frame pel block $x_F$ by the frame sampling matrix $S_F$. A frame sampling matrix $S_F^{1/2}$ for downsampling by a factor of two is represented below:

$$S_F^{1/2} = \frac{1}{2}\begin{bmatrix} 1 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 0 & 0 & 0 & 0 & 1 & 1 \end{bmatrix} \quad (10)$$

The frame sampling matrix $S_F^{1/2}$ may be written more concisely as follows:

$$S_F = \frac{1}{2}\begin{bmatrix} s_{0,1} \\ s_{2,3} \\ \vdots \\ s_{14,15} \end{bmatrix} \quad (11)$$

where $s_{k,l}$ is a row vector of size 1×16, the $k^{th}$ and $l^{th}$ elements of the row vector $s_{k,l}$ are 1, and all others elements of the row vector $s_{k,l}$ are 0.

Similarly, vertical sampling of the pel field block $x_f$ may be represented in equation form as:

$$x_f^v = S_f x_f \quad (12)$$

where the $S_f$ represents a field sampling matrix, and $x_f^v$ represents a vertically resized block due to sampling the pel field block $x_f$ by the field sampling matrix $S_f$. A field sampling matrix $S_f^{1/2}$ for downsampling by a factor of two is represented below in terms is of the row vector $s_{k,l}$:

$$S_f = \frac{1}{2}\begin{bmatrix} s_{0,8} \\ s_{1,9} \\ \vdots \\ s_{7,15} \end{bmatrix} \quad (13)$$

It should be appreciated that the field sampling matrix $S_f^{1/2}$ appropriately averages two spatially adjacent luminance pels of the reordered luminance lines. Also it should be appreciated that averaging is one form of lowpass filtering. Accordingly, the vertical sampling matrices $S_f$ and $S_F$ implicitly lowpass filter the field and frame blocks $x_f$ and $x_F$.

The vertical field and frame resizing matrices $T_f^v$ and $T_F^v$ are respectively defined in terms of the sampling matrices $S_F$ and $S_f$. For example, the vertical field and frame resizing matrices $T_f^{1/2v}$ and $T_F^{1/2v}$ for downsizing by a factor of two are defined in terms of the field and frame sampling matrices $S_f^{1/2}$ and $S_F^{1/2}$ for downsampling by a factor of two as follows:

$$T_F^v \equiv C_8 S_F^{1/2}\begin{bmatrix} C_8^t & 0 \\ 0 & C_8^t \end{bmatrix} \quad (14)$$

$$T_f^v \equiv C_8 S_f^{1/2}\begin{bmatrix} C_8^t & 0 \\ 0 & C_8^t \end{bmatrix} \quad (15)$$

Moreover, the horizontal field and frame resizing matrices $T_f^h$ and $T_F^h$ are respectively defined in terms of appropriate vertical frame resizing matrix $T_F^v$. In particular, the horizontal field and frame resizing matrices $T_f^{1/2h}$ and $T_F^{1/2h}$ for downsizing by a factor of two in the horizontal direction are defined in terms of the vertical frame resizing matrix $T_F^{1/2v}$ for downsizing by a factor of two as follows:

$$T_F^{1/2h} = (T_F^{1/2v})^t \quad (16)$$

$$T_f^{1/2h} = (T_F^{1/2v})^t \quad (17)$$

In other words, the horizontal field and frame resizing matrices $T_f^{1/2h}$ and $T_F^{1/2h}$ for downsizing by a factor of two are defined as the transposition of the vertical frame resizing matrix $T_F^{1/2v}$ for downsizing by a factor of two. It should be appreciated that the field DCT encoding does not reorder luminance pels in the horizontal directional. Accordingly, the horizontal field and frame resizing matrices $T_f^{1/2h}$ and $T_F^{1/2h}$ may be defined in terms of the vertical frame resizing matrix $T_F^{1/2v}$ since the horizontal field and frame resizing matrices $T_f^{1/2h}$ and $T_F^{1/2h}$ need not account for luminance pel reordering.

The field and frame resizing matrices $T_f^{1/2v}$, $T_f^{1/2h}$, $T_F^{1/2v}$, and $T_F^{1/2h}$ for downsizing by a factor of two may be precalculated and stored in the matrix store 506 of the resizing unit 500. The image processor 504 may downsize the frame DCT encoded blocks of the video frame 600 by selecting the frame resizing matrices $T_F^{1/2v}$ and $T_F^{1/2h}$, and applying the selecting matrices $T_F^{1/2v}$ and $T_F^{1/2h}$ to each frame DCT block $X_F$ in accordance with:

$$Y_f = T_f^v X_f T_f^h \quad (18)$$

Similarly, the image processor 504 may downsize the field DCT encoded blocks of the video frame 600 by selecting the field resizing matrices $T_f^{1/2v}$ and $T_f^{1/2h}$, and applying the selecting matrices $T_f^{1/2v}$ and $T_f^{1/2h}$ to each field DCT block $X_f$ in accordance with:

$$Y_f = T_f^v X_f T_f^h \tag{19}$$

In order to better appreciate the resizing Equations (18) and (19), Equation (18) will be analyzed in detail. Applying Equation (14) to Equation (18), Equation (18) may be expanded as follows:

$$Y_F = C_8 S_F \begin{bmatrix} C_8^t & 0 \\ 0 & C_8^t \end{bmatrix} X_F \begin{bmatrix} C_8 & 0 \\ 0 & C_8 \end{bmatrix} S_F^t C_8^t \tag{20}$$

Equation (18) may be decomposed into several operations as follows:

$$x_F = \begin{bmatrix} C_8^t & 0 \\ 0 & C_8^t \end{bmatrix} X_F \begin{bmatrix} C_8 & 0 \\ 0 & C_8 \end{bmatrix} \tag{21}$$

$$x_s = S_F x_F S_F^t \tag{22}$$

$$Y_F = C_8 x_s C_8^t \tag{23}$$

The operation of Equation (21) effectively represents obtaining pel frame blocks $x_F$ by taking the inverse DCT of each frame DCT block $X_F$. The operation of Equation (22) effectively represents sampling the pel frame blocks $x_F$ in the spatial domain with frame sampling matrices $S_F$ to obtain a resized pel block $x_s$. The first multiplication by the frame sampling matrix $S_F$ represents sampling the pel frame blocks $x_F$ in the vertical direction, and the second multiplication by the frame sampling matrix $S_F^t$ represents sampling the pel frame blocks $x_F$ in the horizontal direction. Finally, the operation of Equation (23) effectively represents converting the resized pel block $x_s$ to the DCT domain.

From the above decomposition, it should be appreciated that the resizing unit 500 may downsize the video frame 600 by factors other than 2, and may even upsize the video frame 600 if field and frame upsampling matrices $S_f$ and $S_F$ are used to precalculate resizing matrices $T_f^v$, $T_F^v$, $T_f^h$, and $T_F^h$. Moreover, it should be appreciated that if different sampling matrices $S_f$ and $S_F$ are used to define the vertical and horizontal resizing matrices $T_f^v$, $T_F^v$, $T_f^h$, and $T_F^h$, then the resizing unit 500 may even resize the video frame 600 vertically by a factor that is different than the factor used to resize the video frame 600 horizontally.

It should be noted that the resizing unit 500 obtains a resized DCT representation of the video frame 600 that comprises DCT encoded blocks having the same dimensions as the DCT encoded blocks used to encode the video frame 600. In order words, the resizing unit 500 resizes the video frame 600 comprising 8×8 DCT encoded blocks to obtain a resized video frame that also comprises 8×8 DCT encoded blocks. The resizing unit 500 alters the number of DCT encoded blocks used to represent the video frame 600 but maintains the use of 8×8 DCT encoded blocks to represent the video frame 600. By maintaining the same dimensions for the DCT encoded blocks, the resulting resized video frame 600 may be encoded by the partial video encoder 306 to obtain an MPEG-2 compliant video stream without transforming the DCT blocks to the spatial domain.

Downsizing by a Factor of Three

Due to maintaining the same dimensions for the DCT encoded blocks, downsizing MPEG-2 video streams by factors other than two requires defining sampling matrices that account for both reordered and non-reorder luminance pels in a single pel block $x_f$. For example, downsizing by a factor of three in both the vertical and horizontal direction essentially involves resizing a 24×24 pel block in the spatial domain to obtain a 8×8 pel block. However, due to (i) luminance pels being reordered by field DCT encoding, and (ii) adjacent macroblocks potentially being frame and field DCT encoded, the 24×24 pel block may be represented in the DCT domain by DCT coefficients which span a 32×32 array.

Figure 7:
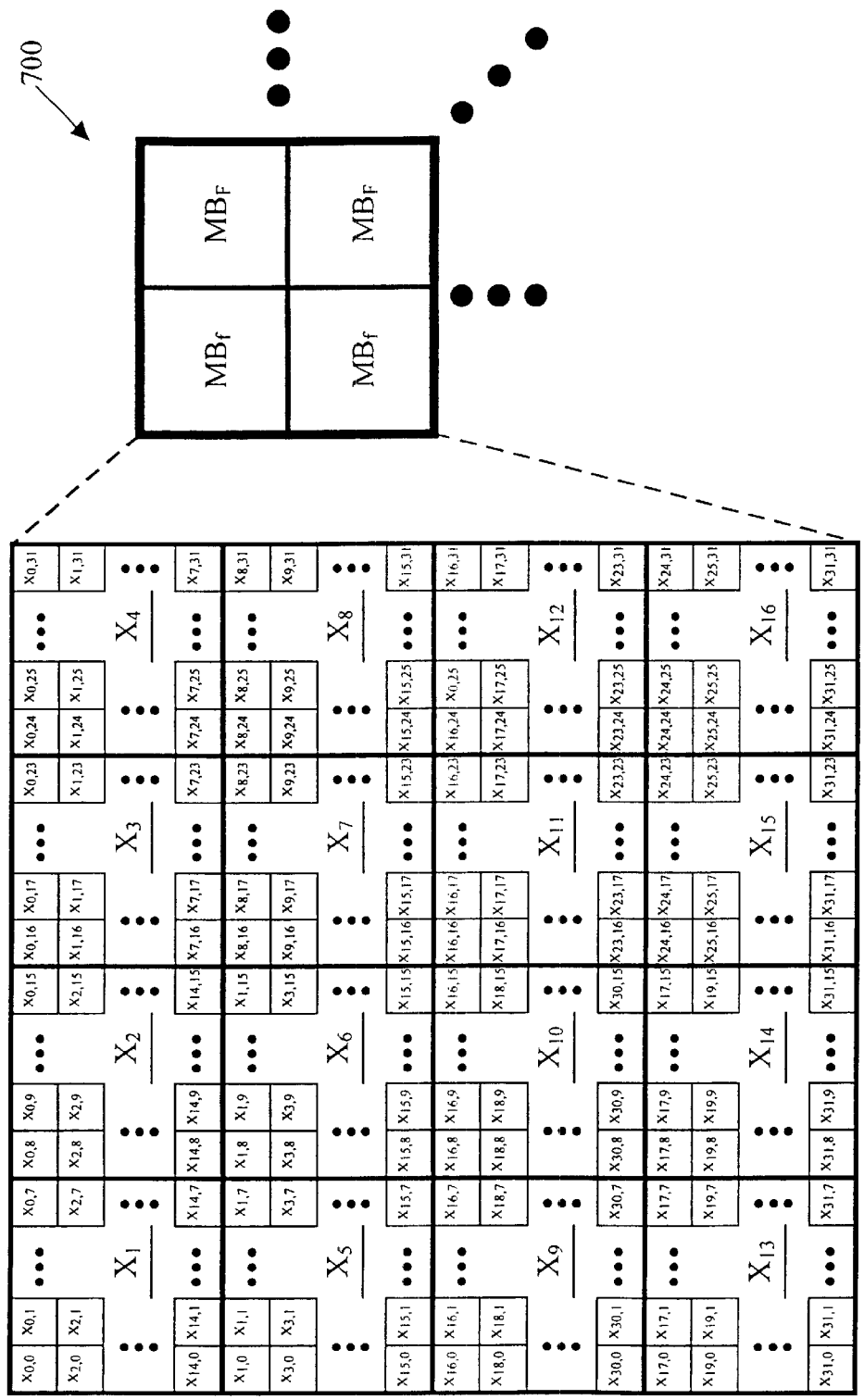
FIG. 7 shows a portion of the video frame of FIG. 6 and the spatial orientation of luminance pel represented by the frame DCT encoded macroblocks and field DCT encoded macroblocks of the portion of the video frame.

In order to better illustrate this concept, a 2×2 macroblock portion 700 of the video frame 600 is illustrated in FIG. 7. The portion 700, as illustrated, includes both frame DCT encoded macroblocks $MB_F$ and field DCT encoded macroblocks $MB_f$. Accordingly, the portion 700 includes sixteen 8×8 DCT encoded blocks $X_1, X_2, \ldots X_{16}$ that collectively represent a 32×32 block of luminance pels in the DCT domain. In particular, as a result of reordering of luminance lines in DCT encoding some of the macroblocks, the DCT blocks $X_1, X_2, \ldots X_{16}$ in combination represent a single 32×32 pel block $x_f$ of partially reordered luminance pels. The pel block $x_f$ depicted in FIG. 7 may be represented by intensity levels $x_{k,l}$ of a frame block $x_F$ (i.e. a block where the luminance lines have not been reordered) as follows:

$$x_f = \begin{bmatrix} x_{0,0} & x_{0,1} & \cdots & x_{0,15} & x_{0,16} & x_{0,17} & \cdots & x_{0,31} \\ x_{2,0} & x_{2,1} & \cdots & x_{2,15} & x_{1,16} & x_{1,17} & \cdots & x_{1,31} \\ \vdots & \vdots & \ddots & \vdots & \vdots & \vdots & \ddots & \vdots \\ x_{14,0} & x_{14,1} & \cdots & x_{14,15} & x_{7,16} & x_{7,17} & \cdots & x_{7,31} \\ x_{1,0} & x_{1,1} & \cdots & x_{1,15} & x_{8,16} & x_{8,17} & \cdots & x_{8,31} \\ x_{3,0} & x_{3,1} & \cdots & x_{3,15} & x_{9,16} & x_{9,17} & \cdots & x_{9,31} \\ \vdots & \vdots & \ddots & \vdots & \vdots & \vdots & \ddots & \vdots \\ x_{15,0} & x_{15,1} & \cdots & x_{15,15} & x_{15,16} & x_{15,17} & \cdots & x_{15,31} \\ x_{16,0} & x_{16,1} & \cdots & x_{16,15} & x_{16,16} & x_{16,17} & \cdots & x_{16,31} \\ x_{18,0} & x_{18,1} & \cdots & x_{18,15} & x_{17,16} & x_{17,17} & \cdots & x_{17,31} \\ \vdots & \vdots & \ddots & \vdots & \vdots & \vdots & \ddots & \vdots \\ x_{30,0} & x_{30,1} & \cdots & x_{30,15} & x_{23,16} & x_{23,16} & \cdots & x_{23,31} \\ x_{17,0} & x_{17,1} & \cdots & x_{17,15} & x_{24,16} & x_{24,17} & \cdots & x_{24,31} \\ x_{19,0} & x_{19,1} & \cdots & x_{19,15} & x_{25,16} & x_{25,17} & \cdots & x_{25,31} \\ \vdots & \vdots & \ddots & \vdots & \vdots & \vdots & \ddots & \vdots \\ x_{31,0} & x_{31,1} & \cdots & x_{31,15} & x_{31,16} & x_{31,17} & \cdots & x_{31,31} \end{bmatrix} \tag{24}$$

where $x_{k,l}$ represents the intensity level of a single luminance pel. The pel block $x_f$ may then be represented in the DCT domain by a 32×32 block $X_f$ of DCT coefficients which comprises sixteen 8×8 DCT blocks $X_1, X_2, \ldots X_{16}$.

A vertical sampling matrix $S_F^{1/3v}$ for downsampling the pel block $x_f$ may be defined in reference to the intensity levels $x_{k,l}$ of the above matrix. In particular, the vertical sampling matrix $S_F^{1/3v}$ essentially averages the intensity values $x_{k,l}$ of three spatially adjacent and vertically aligned pels to obtain a single pel having an intensity value equal to the obtained average. The vertical sampling matrix $S_F^{1/3v}$ is represented in the following Equation (25):

$$S_f^{\frac{1}{3}v} = \frac{1}{3}\begin{bmatrix} s_{0,1,8} \\ s_{2,9,10} \\ s_{3,4,11} \\ s_{5,12,13} \\ s_{6,7,14} \\ s_{15,16,24} \\ s_{17,18,25} \\ s_{19,26,27} \end{bmatrix} \quad (25)$$

where $s_{j,k,l}$ is a row vector of size 1×32, the $j^{th}$, $k^{th}$ and $l^{th}$ elements of the row vector $s_{j,k,l}$ are 1, and all others elements of the row vector $s_{j,k,l}$ are 0. It should be appreciated that the vertical sampling matrix $S_F^{1/3v}$ takes into account the reordering of the luminance pels in order to average three spatially adjacent pels $x_{k,l}$.

Similarly, a horizontal sampling matrix $S_F^{1/3h}$ for downsampling the 32×32 pel block $x_f$ may be define in reference to the above intensity levels $x_{k,l}$. In particular, the horizontal sampling matrix $S_F^{1/3h}$ essentially averages the intensity values $x_{k,l}$ of three horizontally adjacent pels to obtain a single pel having an intensity value equal to the obtained average. The horizontal sampling matrix $S_F^{1/3h}$ may be represented as:

$$S_f^{\frac{1}{3}h} = \frac{1}{3}\begin{bmatrix} s_{0,1,2} \\ s_{3,4,5} \\ \vdots \\ s_{21,22,23} \end{bmatrix} \quad (26)$$

where $s_{j,k,l}$ is a row vector of size 1×32, the $j^{th}$, $k^{th}$ and $l^{th}$ elements of the row vector $s_{j,k,l}$ are 1, and all others elements of the row vector $s_{j,k,l}$ are 0. It should be appreciated that application of the vertical sampling matrix $S^{1/3v}$ essentially undoes the reordering of the luminance lines. Accordingly, the horizontal sampling matrix $S^{1/3h}$ need not take into account reordering of the luminance pets in order to average three horizontally adjacent pels $x_{k,l}$. Furthermore, it should be appreciated that the horizontal sampling matrix $S^{1/3h}$ should actually be the transposition of the above definition for the horizontal sampling matrix $S^{1/3h}$. This transposition of the horizontal sampling matrix $S^{1/3h}$, however, is accounted for by the below definition of the horizontal resizing matrix $T^{1/3h}$.

The vertical resizing matrix $T^{1/3v}$ for downsizing by a factor of three is defined in terms of the vertical sampling matrices $S^{1/3v}$ for downsampling by a factor of three as follows:

$$T^{\frac{1}{3}v} \equiv C_8 S^{\frac{1}{3}v} \begin{bmatrix} C_8^t & 0 & 0 & 0 \\ 0 & C_8^t & 0 & 0 \\ 0 & 0 & C_8^t & 0 \\ 0 & 0 & 0 & C_8^t \end{bmatrix} \quad (27)$$

Moreover, the horizontal resizing matrix $T^{1/3h}$ for downsizing by a factor of three is defined in terms of the vertical sampling matrices $S^{1/3v}$ for downsampling by a factor of three as follows:

$$T^{\frac{1}{3}h} \equiv C_8 S^{\frac{1}{3}h} \begin{bmatrix} C_8^t & 0 & 0 & 0 \\ 0 & C_8^t & 0 & 0 \\ 0 & 0 & C_8^t & 0 \\ 0 & 0 & 0 & C_8^t \end{bmatrix} \quad (28)$$

The resizing matrices $T^{1/3v}$ and $T^{1/3h}$ for downsizing by a factor of three may be precalculated and stored in the matrix store 506 of the resizing unit 500. The image processor 504 may downsize the portion 700 of the video frame 600 by selecting the resizing matrices $T^{1/3v}$ and $T^{1/3h}$, and applying the selecting resizing matrices $T^{1/3v}$ and $T^{1/3h}$ to the DCT block $X_f$ in accordance with Equation (32) presented below.

$$Y_f = T^{1/3v} X_f T^{1/3h} \quad (29)$$

It should be appreciated that additional vertical resizing matrices $T^v$ would need to be precalculated and stored in the matrix store 506 in order to downsize the whole video frame 600 by a factor of three. These additional vertical resizing matrices $T^v$ would essentially be based upon different vertical sampling matrices $S^v$ that account for different luminance pel patterns that may occur in the 32×32 pel block $x_f$. These different luminance pel patterns result from different 2×2 configurations of frame DCT encoded macroblocks $MB_F$ and field DCT encoded macroblocks $MB_f$ throughout the video frame 600.

Upsizing by a Factor of Two

The resizing unit 500 may also upsize the video frame 600. For example, the resizing unit 500 may upsize the video frame 600 by a factor of two in both the vertical and horizontal directions. In particular, the resizing unit 500 may apply field resizing matrices $T_f^{2v}$ and $T_f^{2h}$ to each field DCT encoded $MB_f$ of the video frame 600 in order to upsize the video frame 600 by a factor of two. Similarly, the resizing unit 500 may apply frame resizing matrices $T_F^{2v}$ and $T_F^{2h}$ to each frame DCT encoded macroblock $MB_f$ of the video frame 600 in order to upsize the video frame 600 by a factor of two.

A relatively simple and effective method of upsizing the video frame 600 by a factor of two is to upsample intensity values of the video frame 600 by a factor of two. Upsampling may be accomplished by interpolating intensity values for pels that lie between original pels of the macroblock. However, for small upsampling factors such as a factor of two it is much simpler to double each pel of the macroblock. A frame upsampling matrix $S_F^2$ for upsampling by a factor of two is represented below:

$$S_F^2 = \begin{bmatrix} s_0 \\ s_0 \\ s_1 \\ s_1 \\ \vdots \\ s_7 \\ s_7 \end{bmatrix} \quad (30)$$

where $s_k$ is a row vector of size 1×8, the $k^{th}$ elements of the row vector $s_k$ are 1, and all others elements of the row vector $s_k$ are 0.

Similarly, a field upsampling matrix $S_f^2$ for upsampling by a factor of two is represented below in terms of the row vector $s_k$:

$$S_f^2 = \begin{bmatrix} s_0 \\ s_1 \\ s_2 \\ \vdots \\ s_7 \\ s_0 \\ s_1 \\ s_2 \\ \vdots \\ s_7 \end{bmatrix} \quad (31)$$

It should be appreciated that the field sampling matrix $S_f^2$ appropriately accounts for reordered lines in the field DCT encoded macroblocks $MB_f$.

The vertical field and frame resizing matrices $T_f^{2v}$ and $T_F^{2v}$ are respectively defined in terms of the sampling matrices $S_f^2$ and $S_F^2$ as follows:

$$T_F^{2v} \equiv \begin{bmatrix} C_8 & 0 \\ 0 & C_8 \end{bmatrix} S_F^2 C_8^t \quad (32)$$

$$T_f^{2v} \equiv \begin{bmatrix} C_8 & 0 \\ 0 & C_8 \end{bmatrix} S_f^2 C_8^t \quad (33)$$

Moreover, the horizontal field and frame resizing matrices $T_f^{2h}$ and $T_F^{2h}$ for upsizing by a factor of two in the horizontal direction are defined in terms of the vertical frame resizing matrix $T_F^{2v}$ for upsizing by a factor of two as follows:

$$T_F^{2h} = (T_F^{2v})^t \quad (34)$$

$$T_f^{2h} = (T_f^{2v})^t \quad (35)$$

In other words, the horizontal field and frame resizing matrices $T_f^{2h}$ and $T_F^{2h}$ for upsizing by a factor of two are defined as the transposition of the vertical frame resizing matrix $T_F^{2v}$ for upsizing by a factor of two. It should be appreciated that field DCT encoding does not reorder luminance pels in the horizontal directional. Accordingly, the horizontal field resizing matrices $T_f^{2h}$ may be defined in terms of the vertical frame resizing matrix $T_F^{2v}$ since the horizontal field resizing matrix $T_f^{2h}$ need not account for luminance pel reordering.

The field and frame resizing matrices $T_f^{2v}$, $T_f^{2h}$, $T_F^{2v}$, and $T_F^{2h}$ for upsizing by a factor of two may be precalculated and stored in the matrix store 506 of the resizing unit 500. The image processor 504 may upsize the frame DCT encoded blocks of the video frame 600 by selecting the frame resizing matrices $T_F^{2v}$ and $T_F^{2h}$, and applying the selecting matrices $T_F^{2v}$ and $T_F^{2h}$ to each 8×8 frame DCT block $X_F$ in accordance with Equation (39) presented below.

$$Y_F^{2vh} = T_F^{2v} X_F T_F^{2h} \quad (36)$$

where $Y_F^{2vh}$ represents a 2×2 array of 8×8 frame DCT blocks.

Similarly, the image processor 504 may upsize the field DCT encoded blocks of the video frame 600 by selecting the field resizing matrices $T_f^{2v}$ and $T_f^{2h}$, and applying the selecting matrices $T_f^{2v}$ and $T_f^{2h}$ to each 8×8 field DCT block $X_f$ in accordance with Equation (31) presented below.

$$Y_f^{2vh} = T_f^{2v} X_f T_f^{2h} \quad (37)$$

where $Y_f^{2vh}$ represents a 2×2 array of 8×8 frame DCT blocks.

Figure 8:
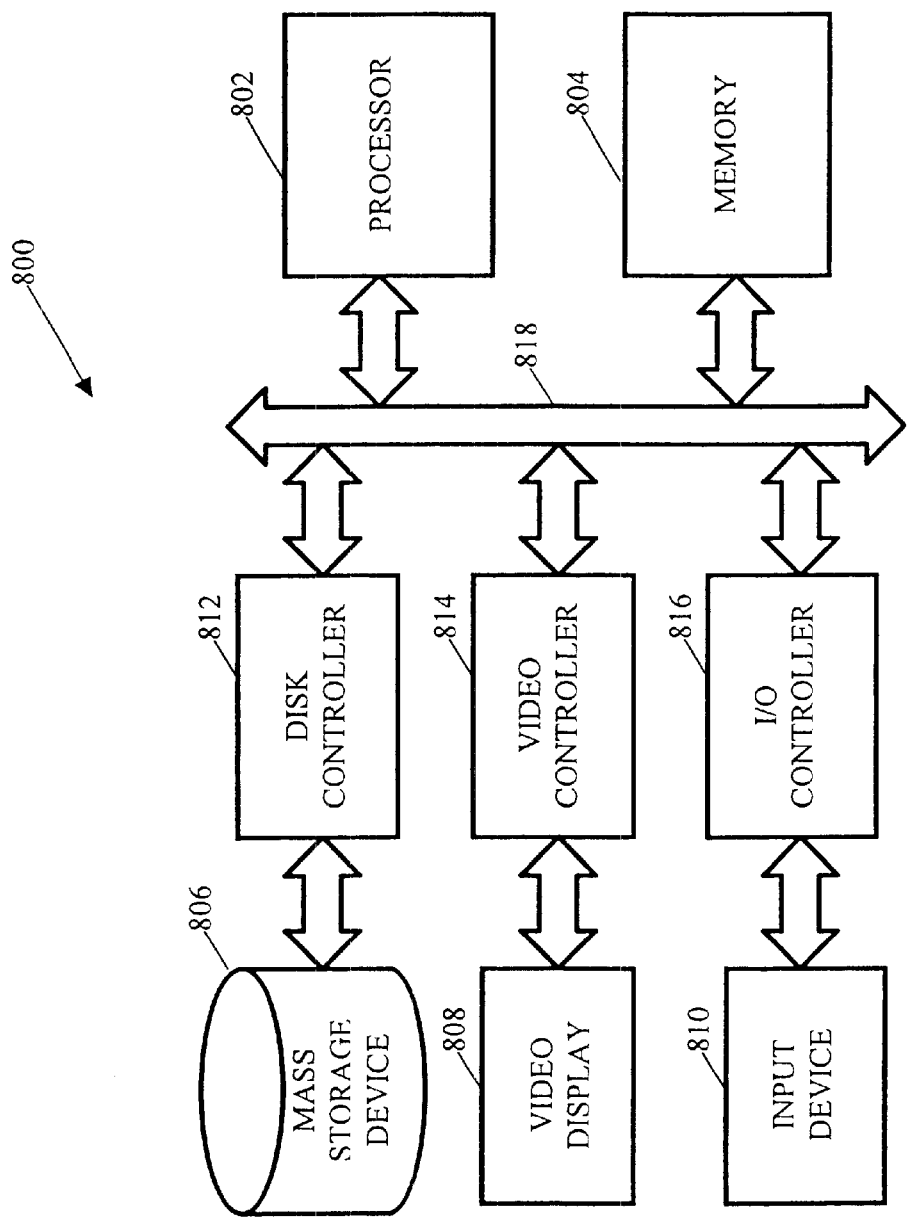
FIG. 8 shows a general processing system suitable for implementing the video is editing system of FIG. 2.

Implementation of the Transform Domain Video Editing System of the Present Invention It should be appreciated that the blocks of the video editing system 200 may be implemented with various hardware components such a digital signal processors, digital logic components, and analog components. Moreover, it should be appreciated that blocks of the video editing system 200 may be implemented with properly programmed general processors. For example, FIG. 8 illustrates a general processing system 800 which is suitable for implementing the video editing system 200 of the present invention. In particular, the general processing system 800 includes a processor 802, memory 804, mass storage device 806, video display 808, and input device 810. Moreover, the general processing system 800 includes a disk controller 812 for controlling the mass storage device 806, a video controller 814 for controlling the video display 808, an I/O controller 816 for controlling the input device 810, and a system bus 818. The system bus 818 operably couples the processor 802 to the memory 804, the disk controller 812, the video controller 814, and the I/O controller 816.

The memory 804 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, and hard disks. The memory 804 may also include nonvolatile computer readable medium such as PROM (programmable read only memory), EPROM (electrically PROM), EEPROM (electrically erasable PROM), and flash memory that store software routines. In particular, the memory 804 stores resizing matrices and software routines which, when executed by the processor 802, cause the processor 802 to resize video streams stored on the mass storage device 806 in the DCT domain.

The processor 802 is operable to execute the software routines stored in the memory 804, and communicate with the mass storage device 806, the video display 808, and the input device 810 via the disk controller 812, the video controller 814, and the I/O controller 816 respectively. Most importantly, the processor 802 is operable to execute software routines of the memory 804 which cause the processor 802 to implement the functionality of partial video decoder 204, transform domain editing unit 206, and the partial video encoder 208 of the video editing system 200. In particular, the processor 802 is operable to partially decode video streams stored on the mass storage device 202, resize in the DCT domain the partially decoded video streams which include field DCT encoded blocks, and partially decode the resized video stream for storage upon the mass storage device 202.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected. For example, while the present invention has been described in reference to resizing MPEG-2 video streams, features of the present invention may also be applied to resizing and decoding video streams that have been compressed in accordance with other video compression standards. Moreover, features of the present invention may be applied to resizing video streams that are transformed using other transformations such as the discrete sine transform (DST), and the Hadamard transform.

What is claimed is:

1. A method of resizing a spatial domain image represented in a transform domain by a plurality of transform domain blocks, comprising the steps of:
   (A) obtaining from said plurality of transform domain. blocks, a first transform domain block that represents in said transform domain a plurality of pels reordered in a field format in said spatial domain image;
   (B) resizing said first transform domain block by operating upon said first transform domain block in said transform domain, said resizing including the steps of:
   (B1) obtaining a first resizing matrix that is based upon $$C_8 S_f^{1/2v} \begin{bmatrix} C_8^1 & 0 \\ 0 & C_8^1 \end{bmatrix},$$

wherein $C_8$ represents an 8×8 DCT matrix, and $S_f^{1/2v}$ represents an 8×16 vertical downsampling matrix that downsamples reordered pels represent by said first transform domain block by a factor of two; and
   (B2) obtaining a second resizing matrix that is based upon $$C_8 S^{1/2h} \begin{bmatrix} C_8^1 & 0 \\ 0 & C_8^1 \end{bmatrix},$$

wherein $S^{1/2h}$ represents an 8×16 downsampling matrix; and
   (B3) multiplying said first resizing matrix, said first transform domain block, and said second resizing matrix together to obtain a resized transform domain block having different resolution than said first transform domain block.

2. A method of resizing a spatial domain image represented in a transform domain by a plurality of transform domain blocks ones of which have been spatially frame-to-field or field-to-frame reordered, comprising the steps of:
   (A) obtaining a first transform domain block from said plurality of transform domain blocks;
   (B) determining whether said first transform domain block represents in said transform domain (i) spatially frame-to-field reordered pels of said spatial domain image, or (ii) spatially intact non-reordered pels of said spatial domain Image;
   (C) performing in said transform domain, field block resizing operations upon said first transform domain block according to the equation $$Y_f = T_f^v X_f T_f^h$$

if said step (B) determines that said first transform domain block represents spatially frame-to-field reordered pels of said spatial domain image, where $X_f$ represents a coefficient matrix of frame-to-field reordered blocks, $T_f^v$ represents a DCT vertical resizing matrix for resizing field DCT coded blocks in the vertical direction, $T_f^h$ represents a DCT horizontal resizing matrix for resizing field DCT coded blocks in the horizontal direction and $Y_f$ represents a resized field DCT block;
   (D) performing in said transform domain, frame block resizing operations upon said first transform domain block according to the equation $$Y_F = T_F^v X_F T_F^h$$

if said step (B) determines that said first transform domain block represents spatially intact non-reordered pels of said spatial domain image, where $X_F$ represents a coefficient matrix of frame ordered blocks, $T_F^v$ represents a DCT vertical resizing matrix for resizing frame DCT coded blocks in the vertical direction, $T_F^h$ represents a DCT horizontal resizing matrix for resizing frame DCT coded blocks in the horizontal direction and $Y_F$ represents a resized frame DCT block; and
   where $T_F^v$ is not equal to $T_f^h$.

3. The method of claim 2, wherein said step (C) comprises the step of:
   (C1) downsizing said first transform domain block in said transform domain by a downsizing factor.

4. The method of claim 2, wherein said step (C) comprises the step of:
   (C1) upsizing said first transform domain block in said transform domain by a upsizing factor.

5. The method of claim 2 wherein the matrix $T_f^h$ is a product of matrices, one of which is of the form $$S_f = \frac{1}{2} \begin{bmatrix} s_{0,8} \\ s_{1,9} \\ \vdots \\ s_{7,15} \end{bmatrix}$$

where the designated coefficients in the matrix have unit values.

6. A method of resizing a spatial domain image represented in a transform domain by a plurality of transform domain blocks ones of which have been spatially field/frame reordered, comprising the steps of:
   (A) obtaining a first transform domain block from said plurality of transform domain blocks;
   (B) determining whether said first transform domain block represents in said transform domain (i) spatially field/frame reordered pels of said spatial domain image, or (ii) spatially intact pels of said spatial domain mage;
   (C) performing in said transform domain, field (frame) block resizing operations upon said first transform domain block if said step (B) determines that said first transform domain block represents spatially field/frame reordered pels of said spatial domain image including;
   (C1) obtaining a first resizing matrix that is based upon $$C_8 S_f^{1/2v} \begin{bmatrix} C_8^1 & 0 \\ 0 & C_8^1 \end{bmatrix},$$

wherein $C_8$ represents an 8×8 DCT matrix, and $S_f^{1/2v}$ represents an 8×16 vertical downsampling matrix that downsamples reordered pels represented by said first transform domain block by a factor of two:
   (C2) obtaining a second resizing matrix that is based upon $$C_8 S^{1/2h} \begin{bmatrix} C_8^1 & 0 \\ 0 & C_8^1 \end{bmatrix},$$

wherin $S^{1/2h}$ represents an 8×16 downsampling matrix; and
   (C3) multiplying said first resizing matrix, said first transform domain block, and said second resizing matrix together to obtain a resized transform domain block having a different resolution than said first transform domain block; and (D) performing in said transform domain, frame (field) block resizing operations upon said first transform domain block if said step (B) determines that said first transform domain block represents spatially intact pels of said spatial domain image.

7. The method of claim 2, further comprising the steps of:

(E) obtaining a second transform domain block from said plurality of transform domain blocks;

(F) determining whether said second transform domain block represents in said transform domain (i) spatially reordered pels of said spatial domain image, or (ii) spatially intact pels of said spatial domain image;

(G) performing in said transform domain, said field block resizing operations upon said second transform domain block if said step (F) determines that said second transform domain block represents spatially reordered pels of said spatial domain image; and (H) performing in said transform domain, said frame block resizing operations upon said second transform domain block if said step (F) determines that said second transform domain block represents spatially intact pels of said spatial domain image.

8. A computer readable medium for configuring a processor to resize a spatial domain image that is represented in a transform domain by a plurality of transform domain blocks, ones of which have been spatially frame-to-field or field-to-frame reordered, comprising a plurality of instructions which when executed by said processor cause said processor to:

(A) obtaining a first transform domain block from said plurality of transform domain blocks;

(B) determining whether said first transform domain block represents in said transform domain (i) spatially frame-to-field reordered pels of said spatial domain image, or (ii) spatially intact non-reordered pels of said spatial domain Image;

(C) performing in said transform domain, field block resizing operations upon said first transform domain block according to the equation $$Y_f = T_f^v X_f T_f^h$$

if said step (B) determines that said first transform domain block represents spatially frame-to-field reordered pels of said spatial domain image, where $X_f$ represents coefficients of frame-to-field reordered blocks, $T_f^v$ represents a DCT vertical resizing matrix for resizing field DCT coded blocks in the vertical direction, $T_f^h$ represents a DCT horizontal resizing matrix for resizing field DCT coded blocks in the horizontal direction and $Y_f$ represents a resized field DCT block;

(D) performing in said transform domain, frame block resizing operations upon said first transform domain block according to the equation $$Y_F = T_F^v X_F T_F^h$$

if said step (B) determines that said first transform domain block represents spatially intact non-reordered pels of said spatial domain image, where $X_F$ represents coefficients of frame ordered blocks, $T_F^v$ represents a DCT vertical resizing matrix for resizing frame DCT coded blocks in the vertical direction, $T_F^h$ represents a DCT horizontal resizing matrix for resizing frame DCT coded blocks in the horizontal direction and $Y_F$ represents a resized frame DCT block; and where $T_F^v$ is not equal to $T_f^h$.

* * * * *